United States Patent
Stahl et al.

(10) Patent No.: US 12,496,527 B2
(45) Date of Patent: Dec. 16, 2025

(54) TRACKING OBJECTS WITH FIDUCIAL MARKERS IN MULTIPLE ENVIRONMENTS TO PROVIDE SHARED EXPERIENCES

(71) Applicant: Apple Inc., Cupertino, CA (US)

(72) Inventors: Geoffrey Stahl, San Jose, CA (US); Michael J. Rockwell, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 333 days.

(21) Appl. No.: 18/122,819

(22) Filed: Mar. 17, 2023

(65) Prior Publication Data
US 2023/0293998 A1    Sep. 21, 2023

Related U.S. Application Data

(60) Provisional application No. 63/322,004, filed on Mar. 21, 2022.

(51) Int. Cl.
| | | |
|---|---|---|
| *A63F 13/65* | (2014.01) | |
| *A63F 13/52* | (2014.01) | |
| *G06T 11/00* | (2006.01) | |
| *H04L 67/131* | (2022.01) | |

(52) U.S. Cl.
CPC .............. *A63F 13/65* (2014.09); *A63F 13/52* (2014.09); *G06T 11/00* (2013.01); *H04L 67/131* (2022.05)

(58) Field of Classification Search
CPC ........ A63F 13/00; A63F 13/21; A63F 13/213; A63F 13/214; A63F 13/30; A63F 13/40; A63F 13/45; A63F 13/52; A63F 13/5372; A63F 13/57; A63F 13/65; A63F 13/70; G06T 11/00; H04L 67/131
See application file for complete search history.

(56) References Cited

U.S. PATENT DOCUMENTS

| | | | |
|---|---|---|---|
| 11,209,966 B2* | 12/2021 | Drake | G06F 3/04842 |
| 2011/0065496 A1* | 3/2011 | Gagner | G06F 3/011 463/43 |
| 2016/0339337 A1* | 11/2016 | Ellsworth | G02B 5/136 |
| 2017/0249745 A1* | 8/2017 | Fiala | G06T 7/13 |
| 2020/0078680 A1* | 3/2020 | Simpkinson | A63F 3/00643 |
| 2021/0124180 A1* | 4/2021 | Amadio | G06K 7/10881 |
| 2021/0144220 A1* | 5/2021 | Zavesky | G06F 3/011 |
| 2021/0174556 A1* | 6/2021 | Goodsitt | G06K 19/0614 |

FOREIGN PATENT DOCUMENTS

| | | |
|---|---|---|
| KR | 1020100022428 A | 3/2010 |
| WO | WO 03005291 | 1/2003 |
| WO | WO2015034705 | 3/2015 |

OTHER PUBLICATIONS

Korean Intellectual Property Office, Notice of Final Rejection (with English translation), Korean Patent Application No. 10-2023-0035868, 7 pages, Oct. 17, 2025.

* cited by examiner

*Primary Examiner* — Omkar A Deodhar
(74) *Attorney, Agent, or Firm* — Thompson Hine LLP

(57) ABSTRACT

Various implementations disclosed herein include devices, systems, and methods that provide shared extended reality (XR) experiences in which two or more users interact with their own sets of physical objects (e.g., cards, game pieces, dice, chips, etc.) during the shared experiences. Each user may have multiple physical objects, each of those physical objects having the same generic shape, size, etc., but having a unique fiducial marker. The unique fiducial marker of each physical object can be assigned to represent one of multiple virtual content items.

20 Claims, 8 Drawing Sheets

TRACKING OBJECTS WITH FIDUCIAL MARKERS IN MULTIPLE ENVIRONMENTS TO PROVIDE SHARED EXPERIENCES

CROSS-REFERENCE TO RELATED APPLICATIONS

This application claims the benefit of U.S. Provisional Application Ser. No. 63/322,004 filed Mar. 21, 2022, which is incorporated herein in its entirety.

TECHNICAL FIELD

The present disclosure generally relates to using sensor data to provide shared experiences via multiple electronic devices.

BACKGROUND

Various techniques are used to provide shared experiences via multiple devices. For example, video conferencing techniques are used to provide multiple users of multiple electronic devices views of one another and their respective environments during communication sessions. Existing shared experience techniques may not adequately facilitate shared experiences that involve user interactions with physical objects in the users' physical environments.

SUMMARY

Various implementations disclosed herein include devices, systems, and methods that provide shared extended reality (XR) experiences in which two or more users interact with their own sets of physical objects (e.g., cards, game pieces, dice, chips, etc.) during the shared experiences. Each user may have multiple physical objects and each of those physical objects may have the same generic shape and size but have a unique fiducial marker. The unique fiducial marker of each physical object can be assigned to represent one of multiple virtual content items and enable physical interaction with virtual content items. The system may identify generic physical objects that will be used by each of the users and associate those objects with specific virtual content items to enable the users to interact with the virtual content items via the physical objects. For example, each user may have 52 generic, physical playing cards with unique fiducial markers that are associated with virtual playing card identities during an interactive card game experience.

In one example, the devices communicate to provide an XR experience in which the users play a virtual card game with one another in which each of the users is dealt a virtual hand of cards (e.g., two virtual cards in each user's virtual hand of cards). Each user may select a subset of his physical cards (e.g., two physical cards) to represent his virtual hand of cards and hold that subset of physical hands in his hand. The fiducial markers on the subset of cards selected by each user are identified (e.g., via computer vision) and associated with the user's virtual hand of cards. For example, the first player may be virtually dealt a virtual hand (an ace of hearts and a king of hearts) and pick up a first physical card with a first fiducial marker on it and a second card with an eighth fiducial marker on it. The first user's device captures sensor data (e.g., images) of these physical cards and the identified fiducial markers are assigned to the respective virtual content items (e.g., the first fiducial marker is assigned to the ace of hearts and the eighth fiducial marker is assigned to the king of hearts). The first device uses this association to display the virtual content items to the first user, e.g., the first user may see virtual content overlaying his first physical cards showing the ace of hearts rather than the first fiducial marker, etc. The subset of the second user's cards may be similarly processed to assign the fiducial markers on those cards to the virtual hand dealt to the second user and display virtual content overlaying the second user's physical cards to show the virtual cards of his virtual hand. Note that a given fiducial marker may represent different virtual content items to the different users, e.g., the first fiducial marker on one of the first user's cards may represent the ace of hearts to the first user while the same first fiducial marker on the second user's cards may represent the ace of diamonds to the second user.

A given fiducial marker may be assigned to represent different content items from game to game and even within the same game. For example, each of the users may have a stack of cards on their respective tables acting as a physical representation of a virtual discard pile. The first user may lay his physical card with the first fiducial marker (e.g., associated with the ace of hearts) down on top of his discard pile (with the physical card face up). This card continues to represent the ace of hearts to the first user in his view of the XR environment. In addition, this action of laying that card on the discard pile is an action that is simulated or represented to the second user. The second user's physical pile of cards representing the discard pile has not physically changed. However, the fiducials on the top card in that physical pile may be reassigned to be associated with the ace of hearts. The second user's view may be adjusted to show this physical card as the ace of hearts and the second user may be enabled to interact with this physical card, e.g., being able to pick up this physical card to add the ace of spades to his own hand.

In the above-described examples, physical objects representing virtual content items are managed to enable a shared XR experience in which the users are enabled to interact with physical objects in their respective environments to interact with corresponding virtual content items. Moreover, a respective physical object in each of the physical environments may correspond to the same virtual content item even if the respective physical objects have different fiducial markers. Techniques disclosed herein enable physical interactions in ways that may otherwise not be possible and thus provide shared experiences that may be realistic or otherwise desirable in ways that were not previously possible.

In some implementations, a processor performs a method by executing instructions stored on a computer readable medium. The method associates a first fiducial marker on a first physical object in a first physical environment with a virtual content item (e.g., ace of hearts card), where the first physical object is depicted as the virtual content item in a first view of an XR environment provided by a first device in the first physical environment. In one example, the first user has a view that depicts virtual content on top of or in place of the generic playing card corresponding to the ace of hearts. The method determines a correspondence between the first physical object and a second physical object in a second physical environment separate from the first physical environment during a communication session between the first device and a second device. In one example, this involves determining that the card on top of the first user's card pile corresponds to the card on the top of the second user's discard pile. Based on the correspondence, the method associates a second fiducial marker on the second physical object with the virtual content item (e.g., ace of hearts card), where the second physical object is depicted as the virtual content item in a second view of the XR environment provided by the second device in the second physical environment. In one example, the second user is presented with a view that depicts virtual content corresponding to the ace of hearts on top of or in place of the generic playing card.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
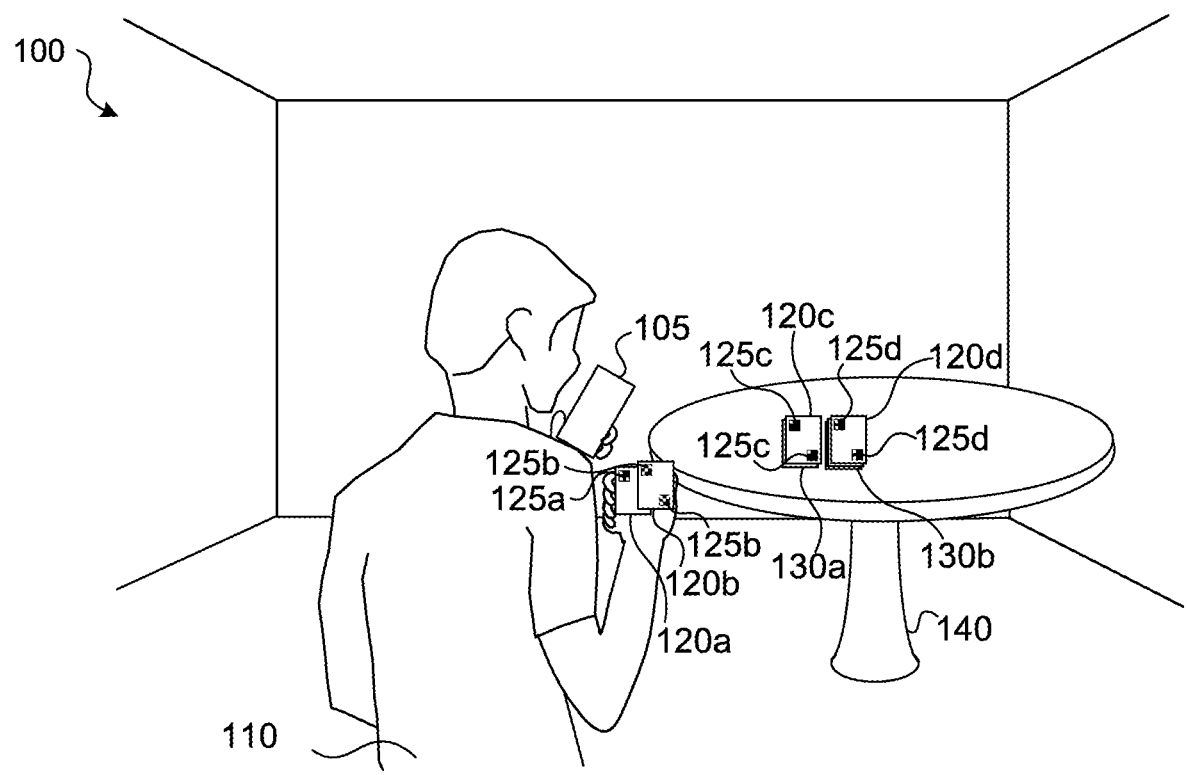
FIG. 1 illustrates a first exemplary electronic device operating in a first physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 2:
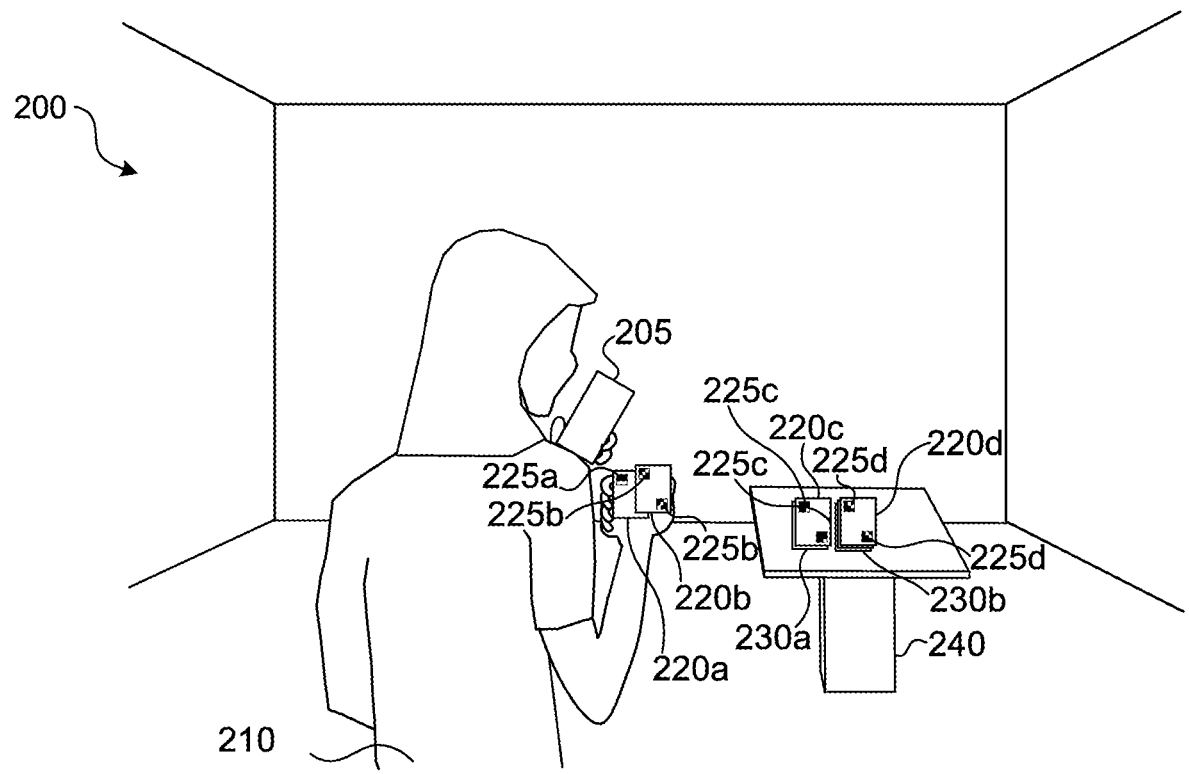
FIG. 2 illustrates a second exemplary electronic device operating in a second physical environment in accordance with some implementations.

FIG. 1 and FIG. 2 illustrate electronic devices 105, 205 that are involved in a communication session with one another to provide a shared XR experience to the two devices' users 110, 210. In FIG. 1, the exemplary electronic device 105 is operating in a physical environment 100. In this example, the physical environment 100 is a room that includes a table 140 and a set of cards (e.g., cards 120*a-d* and the other cards in the card piles 130*a-b*). The cards 120*a-d* and the other cards in the card piles 130*a-b* include fiducial markers which, in this example, are illustrated as unique dot patterns, e.g., the card 120*a* includes one or more depictions of a unique fiducial marker 125*a*, the card 120*b* includes one or more depictions of a unique fiducial marker 125*b*, the card 120*c* includes one or more depictions of a unique fiducial marker 125*c*, the card 120*d* includes one or more depictions of a unique fiducial marker 125*d*, etc. The unique fiducial markers may be depicted on only one side or on both sides (e.g., front and back) of each card. Any type of fiducial markers may be used including, but not limited to, alphanumeric numbers, symbols, patterns, bar codes, or other codes that can be depicted via a sensor. Fiducial markers may be visible or invisible (e.g., detectable via IR detection, etc.). Fiducial markers may be one dimensional, two dimensional, or three dimensional. Fiducial markers may utilize unique colors or color combinations. Fiducial markers may utilize unique shapes, sizes, or other appearance attributes of physical objects. The fiducial markers may include read direction indicators and/or be omnidirectional (e.g., capable of being interpreted without identifying direction/orientation).

In FIG. 1, the electronic device 105 includes one or more cameras, microphones, depth sensors, or other sensors that can be used to capture information about and evaluate the physical environment 100 and the objects within it, as well as information about the user 110 of the electronic device 105. The information about the physical environment 100 and/or user 110 may be used to provide visual and audio content, for example, during a shared extended reality (XR) experience provided during a communication session involving one or more other devices. For example, a communication session may provide views to one or more participants (e.g., user 110, user 210, etc.) of a 3D environment that is generated based on camera images and/or depth sensor images of the physical environment 100 as well as representations of user 110 based on camera images and/or depth sensor images of the user 110. The sensor data may be used to identify fiducial markers and/or the 3D positions of and/or movement of objects that have fiducial markers.

In FIG. 2, the exemplary electronic device 205 is operating in a physical environment 200, which may be different than and/or remote from the physical environment 100 of FIG. 1. In this example, the physical environment 200 is a room that includes a table 240 and a set of cards (e.g., cards 220a-d and the other cards in the card piles 230a-b). The cards 220a-d and the other cards in the card piles 230a-b include fiducial markers which, in this example, are illustrated as unique dot patterns, e.g., the card 220a includes one or more depictions of a unique fiducial marker 225a, the card 220b includes one or more depictions of a unique fiducial marker 225b, the card 220c includes one or more depictions of a unique fiducial marker 225c, the card 220d includes one or more depictions of a unique fiducial marker 225d, etc. The unique fiducial markers may be depicted on only one side or on both sides (e.g., front and back) of each card.

In FIG. 2, the electronic device 205 includes one or more cameras, microphones, depth sensors, or other sensors that can be used to capture information about and evaluate the physical environment 200 and the objects within it, as well as information about the user 210 of the electronic device 205. The information about the physical environment 200 and/or user 210 may be used to provide visual and audio content, for example, during a shared extended reality (XR) experience provided during a communication session involving one or more other devices. For example, a communication session may provide views to one or more participants (e.g., user 210, user 110, etc.) of a 3D environment that are generated based on camera images and/or depth sensor images of the physical environment 200 as well as representations of user 210 based on camera images and/or depth sensor images of the user 210.

The devices 105, 205 provide their respective users 110, 210 with views of an XR environment. In contrast to a physical environment that people can sense and/or interact with without aid of electronic devices, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include, but are not limited to, smartphones, tablets, and desktop/laptop computers, head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback). A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The devices 105, 205 of FIGS. 1-2 communicate with one another to exchange data to provide a shared XR environment in which the users 110, 210 experience at least some of the same visual or audio experience. For example, image and/or audio data from one of the physical environments may be shared to enable the device in the other physical environment to provide a view that uses that information, e.g., by augmenting a view of that physical environment with visual or audible content corresponding to the received image-based, sound-based data. In some implementations, the shared XR environment provides views that include depictions of the other user, e.g., the user 105 may see a depiction of the user 205 and vice versa. In another example, the shared XR environment presents the same virtual content to the users 110, 210. The users 110, 210, for example, may be enabled to view depictions of virtual cards during a virtual card game. The virtual cards may be aligned with and associated with physical objects in the respective physical environments 100, 200. For example, a virtual 3 of clubs card may be aligned and associated with physical card 125c in the physical environment 100 and the virtual 3 of clubs card may be aligned and associated with the physical card 225c in the physical environment 200. The associations between virtual content and physical objects may be used to present shared XR experiences.

Figure 3:
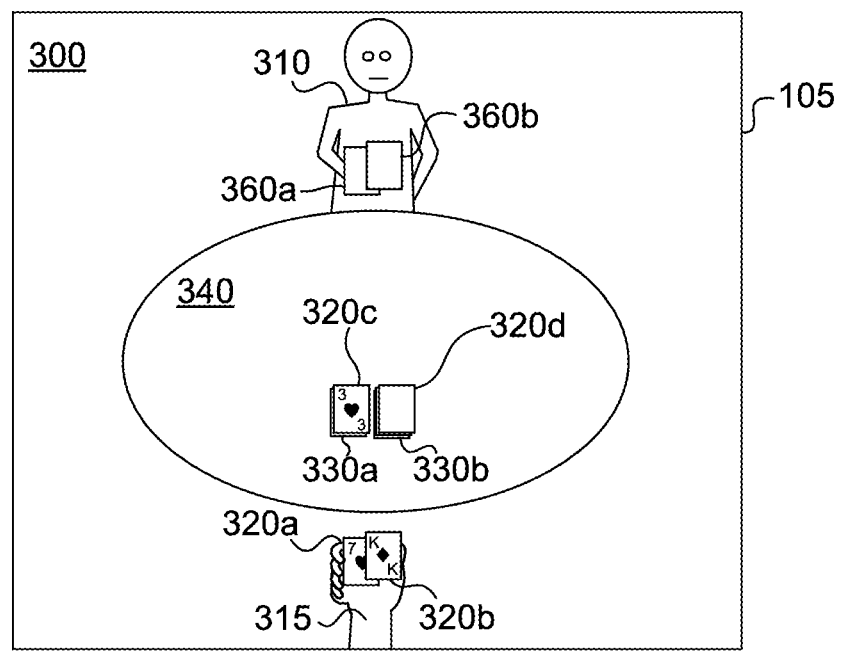
FIG. 3 illustrates of a view of a shared XR experience between the device of FIG. 1 and the device of FIG. 2 provided by the device of FIG. 1 in accordance with some implementations.
Figure 4:
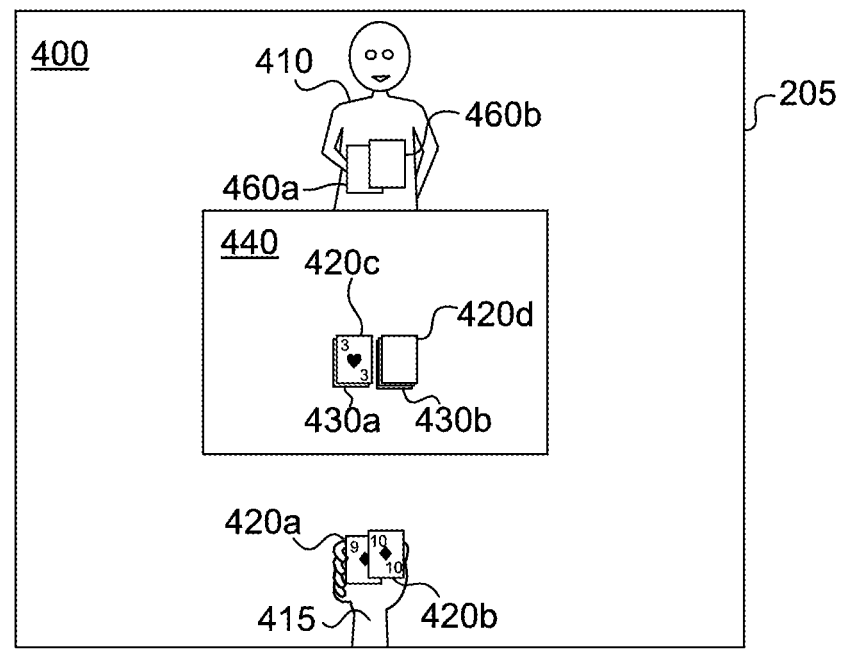
FIG. 4 illustrates a view of a shared XR experience between the device of FIG. 1 and the device of FIG. 2 provided by the device of FIG. 1 in accordance with some implementations.

FIG. 3 and FIG. 4 illustrate views of a shared XR experience between the devices 105, 205. FIG. 3 illustrates of a view 300 of the shared XR experience provided by the device 105. View 300 includes a depiction 315 of the user's 110 hand holding depictions 320a, 320b of the cards 120a, 120b held by the user 110 in physical environment 100. The depiction 320a shows a 7 of hearts card and replaces and/or overlays the fiducial marker 125a on card 120a. The depiction 320b shows a king of diamonds card and replaces and/or overlays the fiducial marker 125b on card 120b.

View 300 further includes a depiction 340 of the table 140 with depictions 320c, 320d of the cards 120c, 120d and depictions 330a, 330b of the card piles 130a, 130b. The depiction 320c shows a 3 of hearts card and replaces and/or overlays the fiducial marker 125c on card 120c. The depiction 320d shows virtual card back (since this virtual stack is face-down draw pile) and replaces and/or overlays the fiducial marker 125d on card 120d.

View 300 further includes a representation 310 (e.g., an avatar) of the user 210. Such a representation may be based on image data and/or other sensor data received during the communication session and thus may depict the user's 210 current appearance, facial expressions, movements, etc. The representation 310 may be simplistic or realistic. In some implementations, the representation accurately depicts pixel-level details of at least a portion of (e.g., the head of) of the user 210 based on live and/or previously captured images of the user 210.

The view 300 also includes depictions 360a, 360b of the cards 220a, 220b that the user 210 is holding. The depiction 360a shows virtual card back (blank since the virtual content of the physical card 220a is intended to be hidden from user 110 since it is in the other user's 210 hand) and may replace and/or overlay any fiducial marker on card 220a. Similarly, the depiction 360b shows virtual card back (blank since the virtual content of the physical card 220b is intended to be hidden from user 110 since it is in the other user's 210 hand) and may replace and/or overlay any fiducial marker on card 220b.

FIG. 4 illustrates of a view 400 of the shared XR experience provided by the device 205. View 400 includes a depiction 415 of the user's 210 hand holding depictions 420a, 420b of the cards 220a, 220b held by the user 210 in physical environment 200. The depiction 420a shows a 9 of diamonds card and replaces and/or overlays the fiducial marker 225a on card 220a. The depiction 420b shows a 10 of diamonds card and replaces and/or overlays the fiducial marker 225b on card 220b.

View 400 further includes a depiction 440 of the table 240 with depictions 420c, 420d of the cards 220c, 220d and depictions 430a, 430b of the card stacks 230a, 230b. The depiction 420c shows a 3 of hearts card and replaces and/or overlays the fiducial marker 225c on card 220c. The depiction 420d shows virtual card back (since this virtual stack is face-down draw pile) and replaces and/or overlays the fiducial marker 225d on card 220d.

View 400 further includes a representation 410 (e.g., an avatar) of the user 110. Such a representation may be based on image and/or other sensor data received during the communication session and thus may depict the user's 110 current appearance, facial expressions, movements, etc. The representation 410 may be simplistic or realistic. In some implementations, the representation accurately depicts pixel-level details of at least a portion of (e.g., the head of) of the user 110 based on live and/or previously captured images of the user 110.

The view 400 also includes depictions 460a, 460b of the cards 120a, 120b that the user 110 is holding. The depiction 460a shows virtual card back (since the virtual content of the physical card 120a is intended to be hidden from user 210 since it is in the other user's 110 hand) and may replace and/or overlay any fiducial marker on card 120a. Similarly, the depiction 460b shows virtual card back (since the virtual content of the physical card 120b is intended to be hidden from user 210 since it is in the other user's 110 hand) and may replace and/or overlay any fiducial marker on card 120b.

In the example of FIGS. 3-4, the shared XR environment presents the some of the same virtual content to the users 110, 210. The view 300, 400 both include depictions 320c, 420c (which are the same) corresponding to the 3 of hearts card, depictions 320d, 430d (which are the same) corresponding to the back of a card, depictions 330a, 430a (which are the same) corresponding to other virtual cards of the discard pile, and depictions 330b, 430b (which are the same) corresponding to virtual cards of a draw pile. These depictions 320c-d, 330a-b, 420c-d, 430a-b are aligned with and associated with different physical objects in the respective physical environments 100, 200. The associations between virtual content and physical objects may be used to present shared XR experiences.

The representation, association, and alignment examples shown in FIGS. 3-4 are merely examples. Numerous other types of physical objects, representations, and/or arrangements may be used to facilitate desirable shared XR experiences. In some implementations, a shared experience is configured to represent, associate, and/or align virtual content and physical objects based on a set of rules or guidelines. Such rules or guidelines may be for a particular game. For example, different representations, associations, and alignments may be used during the games rummy, UNO, bridge, 5 card stud poker, Texas Hold 'Em poker, Monopoly, dice games and during teaching/counselling sessions that use virtual flash cards, etc. In some implementations, one or more users (e.g., game moderators/teachers) are enabled to configure representations, associations, and alignments to suite the requirements of a particular shared experience.

In some implementations, a device (e.g., device 110, device 210, or some other device such as a separate server), manages the overall experience. For example, this may involve the synchronization of the overall game. In some implementations, a device manages the cards for the particular card game. In other implementations, the two devices 110, 210 manage their own copies of the game and only send updates to one another based on the action of the respective user. In some implementations, one device manages the game, e.g., as a host who as purchased and/or downloaded a hosting/moderator instance of the game, other devices, e.g., that have not necessarily purchased/downloaded the hosting/moderator instance of the game, are enabled to participate. In some implementations, no particular device acts as a host/moderator, but rather the multiple devices involved in the experience collectively manage the game by updating each other of the respective user's activity.

In some implementations, management of a shared experience such as a game can be defined by the responsibility of tracking cards. For example, this may involve tracking which cards have been played/burned or are in the user's hands, determining where the cards should be placed on the table (alternatively: determining which cards on the table are for what purpose), and/or identifying how many cards are left, etc. A management application may use a defined set of unique cards, e.g., a deck of 52 standard playing cards, a combined deck of 2 standard playing card decks, a set of unique cards corresponding to a particular game that has 4 wild cards, 4 red diamond number 2 cards, 4 red diamond number 3 cards, etc. A management application may track unique instances of cards and their associations with physical objects in each of multiple user's environments. In some implementations, a game card is not necessarily assigned to a particular physical card until the physical card is active in the game, e.g., until a user draws the physical card from a pile. Similarly, in some implementations, a game card to physical card assignment may be changed during the course of the game, e.g., when the top card on the discard pile is changed to refer to a game card laid down on the other player's discard pile.

In some implementations, management of an experience may involve detecting the layout of physical cards, e.g., on users' tables and/or hands, and automatically initiate the game sequence without having the user actively select a game to play, e.g., recognizing that a user is playing game A based on such layout(s). For instance, the devices can detect that each user is holding half a deck and initiate the game of war, or the devices can detect that the cards are laid out for the game of Speed and initiate the game of Speed while allowing the game to start with a voice command. Each device may confirm that the respective user has placed the cards in the correct layout and have the correct number of cards in their hand before initiating the game, or allowing the user to provide input (e.g., vocally, gesture-based, etc.) start the game.

In some implementations, the representations, associations, and alignments of virtual content items and physical objects is triggered by a user action, activity in one of the physical environments, and/or an otherwise triggering activity. Examples of triggering activities include, but are not limited to, a user picking up a card from a draw pile, discarding a card on a discard pile, turning over a set of cards (e.g., a poker flop), laying down cards (e.g., rummy) or laying down a hand on a surface/table.

Figure 5:
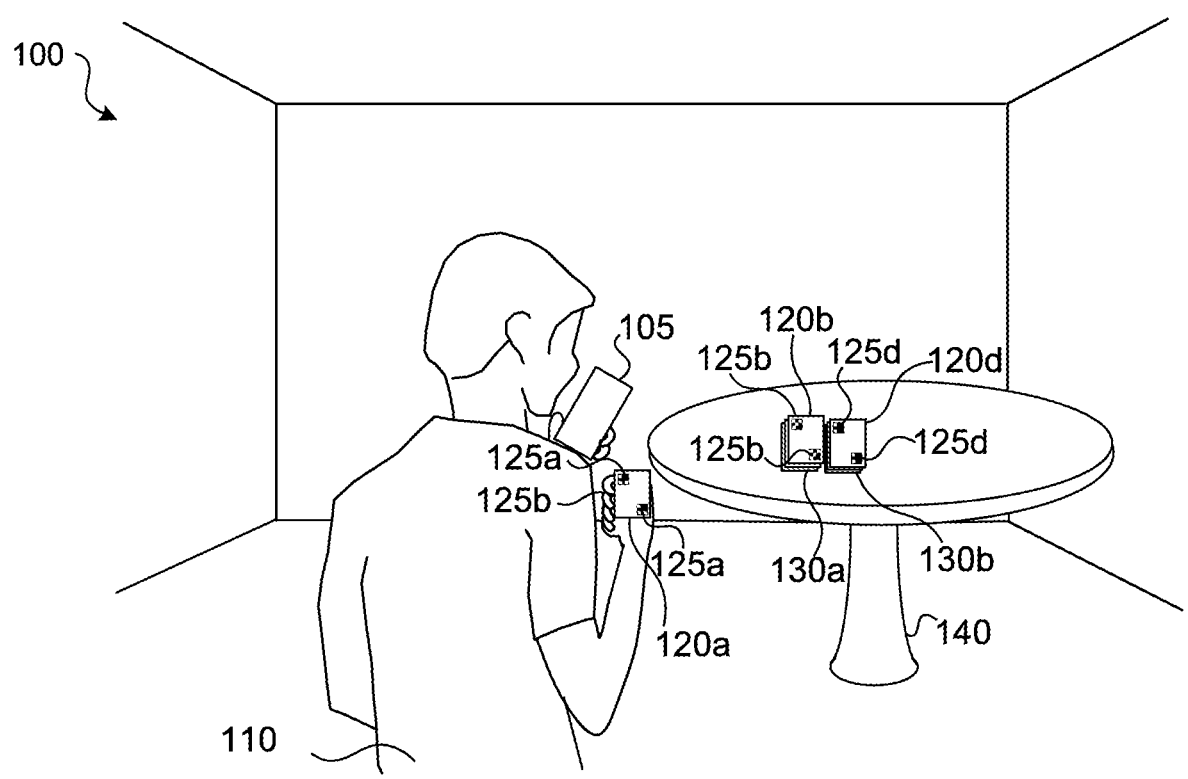
FIG. 5 illustrates an interaction in a first physical environment of FIG. 1 in accordance with some implementations.
Figure 6:
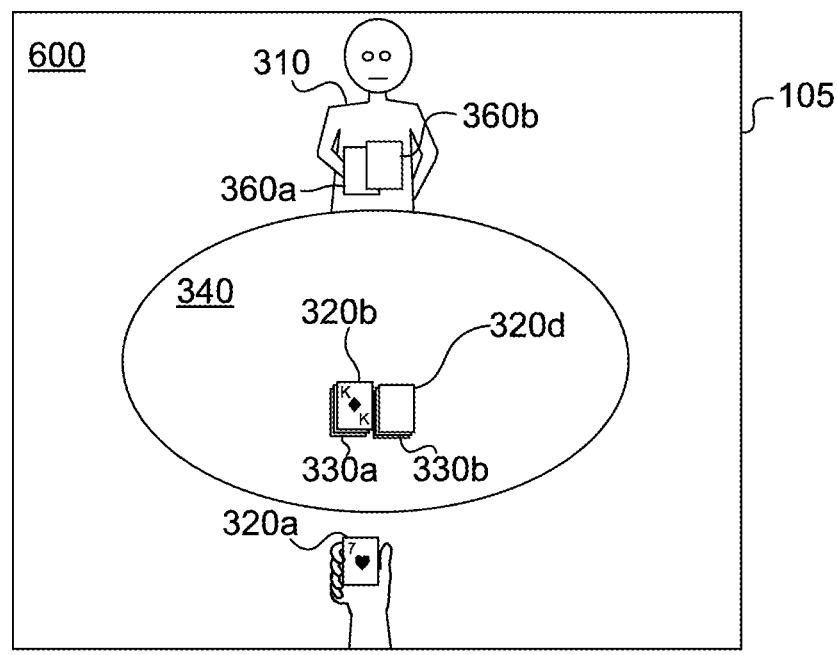
FIG. 6 illustrates a view provided by the device of FIG. 1 following the interaction of FIG. 5 in accordance with some implementations.
Figure 7:
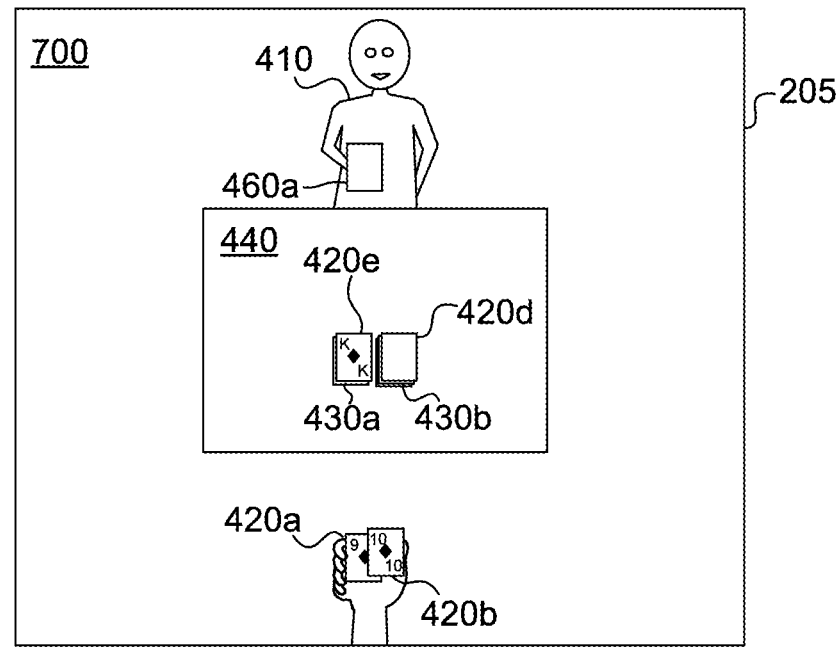
FIG. 7 illustrates a view provided by the device of FIG. 2 following the interaction of FIG. 5 in accordance with some implementation.

FIGS. 5-7 illustrate a user discarding a card from his hand into a shared discard pile triggering changes in the representations, associations, and alignments of virtual content items and physical objects. In FIG. 5 the user 110 has removed card 120*b* from his hand (as show in FIG. 1) and placed it on top of the card pile 130*a* (e.g., corresponding to the virtual discard pile).

FIG. 6 illustrates of a view 600 provided by the device 105 of FIG. 1 following the interaction of FIG. 5. View 600 is similar to view 300 of FIG. 3 with the following changes. First, view 300 includes a depiction 315 of the user's 110 hand holding depictions 320*a*, 320*b*, while view 600 includes depiction 315 of the user's 110 hand holding only depiction 320*a*. This change corresponds to the removal of physical card 120*b* from the user's physical hand. Second, view 300 includes a depiction 340 of the table 140 with depictions 320*c*, 320*d* of the cards 120*c*, 120*d*. In contrast, view 600 includes a depiction 340 of the table 140 with depictions 320*b*, 320*d* of the cards 120*b*, 120*d*. This change corresponds to the addition of the physical card 120*b* to the top of the card stack 130*a*. The depiction 330*a* may additionally be updated to depict the addition of an additional card within the discard pile.

FIG. 7 illustrates of a view 700 provided by the device 205 of FIG. 2 following the interaction of FIG. 5. Nothing in physical environment 200 has necessarily changed. Rather view 700 is changed based on the activity in the other physical environment 100 and/or changes in corresponding virtual content items. View 700 is similar to view 400 of FIG. 4 with the following changes. First, view 400 includes a depiction 440 of the table 240 with depictions 420*c*, 420*d* of the cards 120*c*, 120*d*. In contrast, view 700 includes a depiction 440 of the table 240 with depictions 420*e*, 420*d* of the cards 120*b*, 220*d*. User 120 placing down card 120*b* on card pile 130*a* in physical environment 100 is identified as a change to the virtual discard pile, e.g., the addition of the king of diamonds card on top of the discard pile that is virtually used by both users 110, 210. Accordingly, a corresponding change in associations is made for the electronic device 205, i.e., the fiducial marker 225*c* (FIG. 2) is reassigned from the 3 of hearts virtual card to the king of spades virtual card. Depiction 420*e* is provided to include this change in the view 700. Thus, the view 700 changes without the physical environment 200 having necessarily changed—it is changed by reassigning the fiducial marker 125*c* and thus physical card 220*c* to a new and different virtual content item and displaying a depiction 420*e* of that virtual content item. The user 210 may then interact with this physical card 220*c*, for example, by picking it up and placing it in his own physical hand and corresponding view changes and/or fiducial marker reassignments will be made in the views provided by the devices 105, 205.

In these examples, the users 110, 210 are enabled to have an experience that involves some common virtual objects (e.g., playing cards) that they interact with via fiducially-marked generically sized/shaped physical objects in their respective physical environments. Providing a shared XR experience with such physical interaction capabilities can add to the realism, fun, enjoyment, and other aspects of the shared XR experience.

In some implementations, one or more devices are involved in a communication session that may be coordinated by a server or accomplished via a peer-to-peer communication link. One of the devices and/or a coordinating server or other device may control the XR experience to enable the use of physical objects corresponding to virtual objects. It may enable XR that involves two or more users who use their own physical objects (e.g., cards, dice, game pieces, etc.) having fiducial markers. The fiducial markers may be identified to associate physical objects (e.g., a card on top of each user's discard pile) in their different environments with virtual content (e.g., the ace of hearts). The system/device keeps track of a single XR experience/game based on the interactions the users with their respective card decks, which may be identified using sensor data captured by the devices. For example, a first user may transfer a card to a second user by placing a physical card with a fiducial marker on a transfer pile on his table. Both users may see virtual content that a virtual card (e.g., ace of spades) placed card on top of their respective transfer card pile. The fiducial markers on the top cards of these transfer piles may be assigned to the virtual card value. The second user may pick up the top card from his own transfer pile and move it into his hand. The system may recognize this and adjust both user's view of the transfer pile accordingly.

In some implementations, each of multiple users uses one more stacks of many fiducially-marked generic objects that can be reassigned to enable either of the user's physically interacting with a top item in the respective stacks. The stacks may include enough physical objects so that they will not be completely depleted during an experience based on removals of physical objects from the top of the stacks during the experience. For example, a card pile representing a discard pile or a draw pile may have more than enough cards to correspond to all potential virtual cards that may be in the stack so that removal of one or more physical cards during the experience by a player does not exhaust his or her physical stack. If a physical stack corresponds to a virtual stack that has been virtually depleted, virtual content may be displayed erasing the virtual stack from the view. For example, if there are no more virtual cards in the virtual discard pile even though there are physical cards remaining in the stack that corresponds to the virtual discard pile, virtual content may be displayed that erases the physical cards from view by displaying a generated depiction of the underlying table surface or displaying an empty placeholder to visually indicate where physical cards should be placed for the virtual discard pile in the future.

Figure 8:
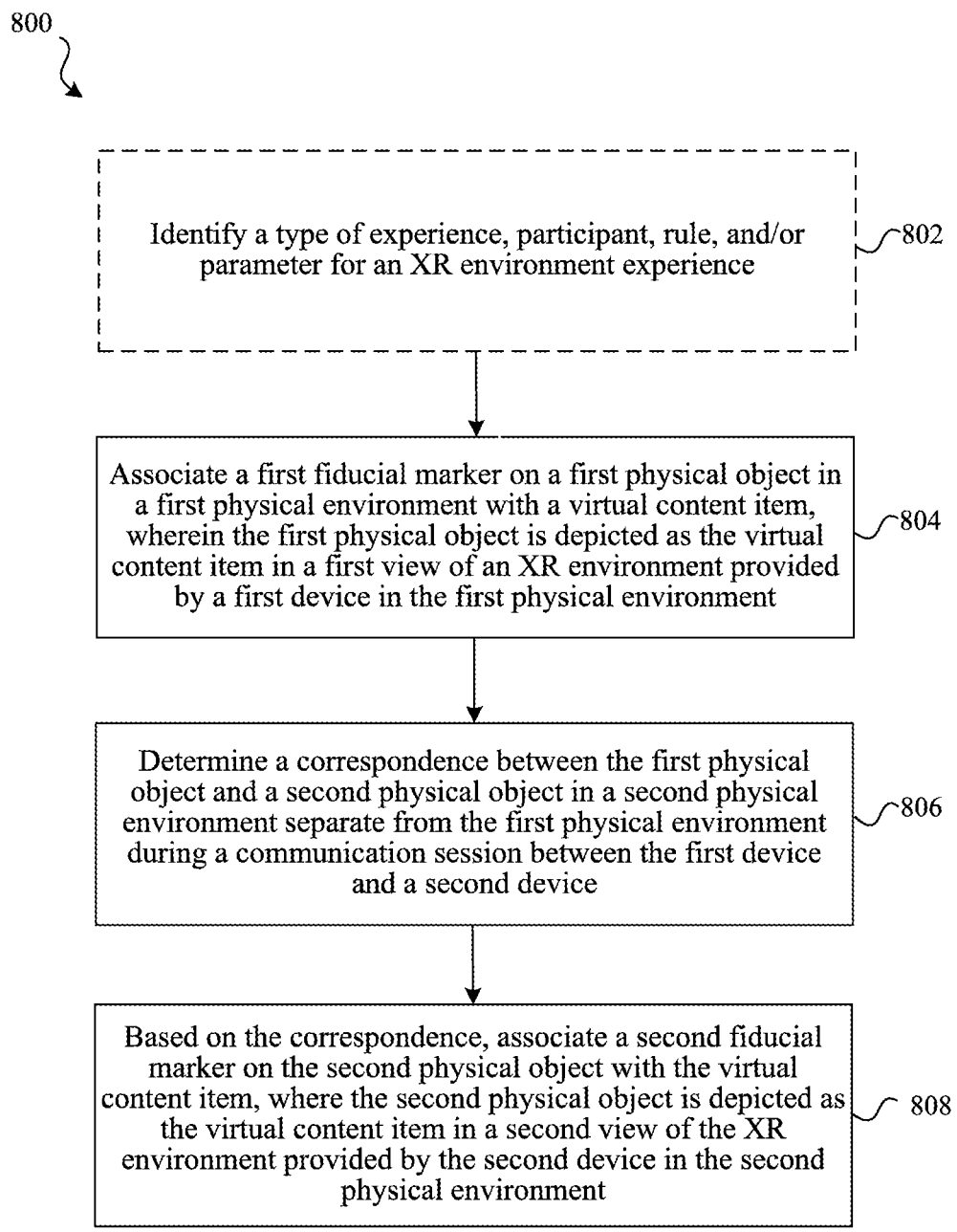
FIG. 8 illustrates a flowchart illustrating an exemplary method for providing a shared XR experience in accordance with some implementations.

FIG. 8 is a flowchart illustrating a method 800 for providing a shared XR experience. In some implementations, one or more devices (such as electronic device 105, electronic device 205, or both) performs method 800. In some implementations, method 800 is performed on a mobile device, desktop, laptop, head-mounted device (HMD), ear-mounted device or server device. The method 800 is performed by processing logic, including hardware, firmware, software, or a combination thereof. In some implementations, the method 800 is performed on a processor executing code stored in a non-transitory computer-readable medium (e.g., a memory).

At block 802, the method 800 optionally identifies a type of experience, participant, rule, and/or parameter for an XR environment experience. Such attributes may be identified based on sensor data and/or input. For example, this may involve determining a type of card game being played based on sensor data from which a layout of cards on the users' tables and/or in the user's hands is identified. In another example, the number and/or participation of participants in the experience is identified based on sensor data used to determine the positions and/or interactions of avatars within an XR environment, e.g., within a threshold distance of table, facing the table, utilizing elements having fiducial markers, etc. In some implementations, input or another trigger is used to identify attributes of an XR experience, e.g., confirming a game type, a user's desire to participate, a particular variant/rule of a game to be used, etc. In some implementations, one or more inputs or other triggers (e.g., vocal or gesture-based commands), such as a user drawing a card or saying "game on", is used to initiate gameplay At block 804, the method 800 associates a first fiducial marker on a first physical object in a first physical environment (e.g., on a generic playing card in the first user's room) with a virtual content item (e.g., ace of hearts card), where the first physical object is depicted as the virtual content item in a first view of an extended reality (XR) environment provided by a first device in the first physical environment. For example, this may involve displaying a view to the first user that includes virtual content on top of the generic playing card corresponding to the ace of hearts.

At block 806, the method 800 determines a correspondence between the first physical object (e.g., the generic playing card in the first user's room) and a second physical object in a second physical environment (e.g., a generic playing card in a second user's room) separate from the first physical environment during a communication session between the first device and a second device. For example, this may involve capturing sensor data and interpreting it using an algorithm and/or machine learning model to determine that the card on the top of the first user's discard pile corresponds to the card on the top of the second user's discard pile.

The first physical environment and the second physical environment may each include a set of physical objects with unique fiducial markers, where the first physical environment comprises a first set of physical objects and the second physical environment comprises a second set of physical objects separate from the first set of physical objects. The unique fiducial markers may be used to synchronize a depiction of virtual content items in the first physical environment and the second physical environment. In some implementations, the fiducial markings are depicted on only a single side of the physical objects. In some implementations, the fiducial markings are depicted on multiple sides of the physical objects.

The correspondence between first physical object and the second physical object may be determined based on an interaction with the first physical object. FIGS. 5-7 provide an illustration of a correspondence being determined based on an interaction, e.g., a first user discarding a physical card on his discard pile causes a card in the second user's discard pile to correspond to it. The respective cards on top of each user's physical discard piles are determined to correspond to each other since they correspond to the same virtual content item, e.g., the king of diamonds card. Examples of interactions include, but are not limited to, a placement of the first physical object on a game surface. (e.g., a table), a placement of the first physical object on a stack of physical objects. (e.g., a discard pile), a reveal of a card held by a first user of the first device.

The correspondence between first physical object and the second physical object may be determined based on one or more instructions (e.g., provided by a participant, moderator, device, or system) to position the first physical object or the second physical object. For example, a computer program providing a poker experience may provide instructions for both users to lay down 3 cards corresponding to a Texas Hold 'Em Poker flop. The correspondence between first physical object and the second physical object is determined based on a rule of a multi-player game (e.g., identifying a draw pile, a discard pile, cards played down based on the rules of rummy 500, war, rat slap, or any other game.

At block 808, based on the correspondence, the method 800 associates a second fiducial marker on the second physical object (e.g., on the generic playing card in the second user's room) with the virtual content item (e.g., ace of hearts card), wherein the second physical object is depicted as the virtual content item in a second view of the XR environment provided by the second device in the second physical environment. This may involve providing a view to the second user including virtual content corresponding to the ace of hearts on top of the generic playing card.

Figure 9:
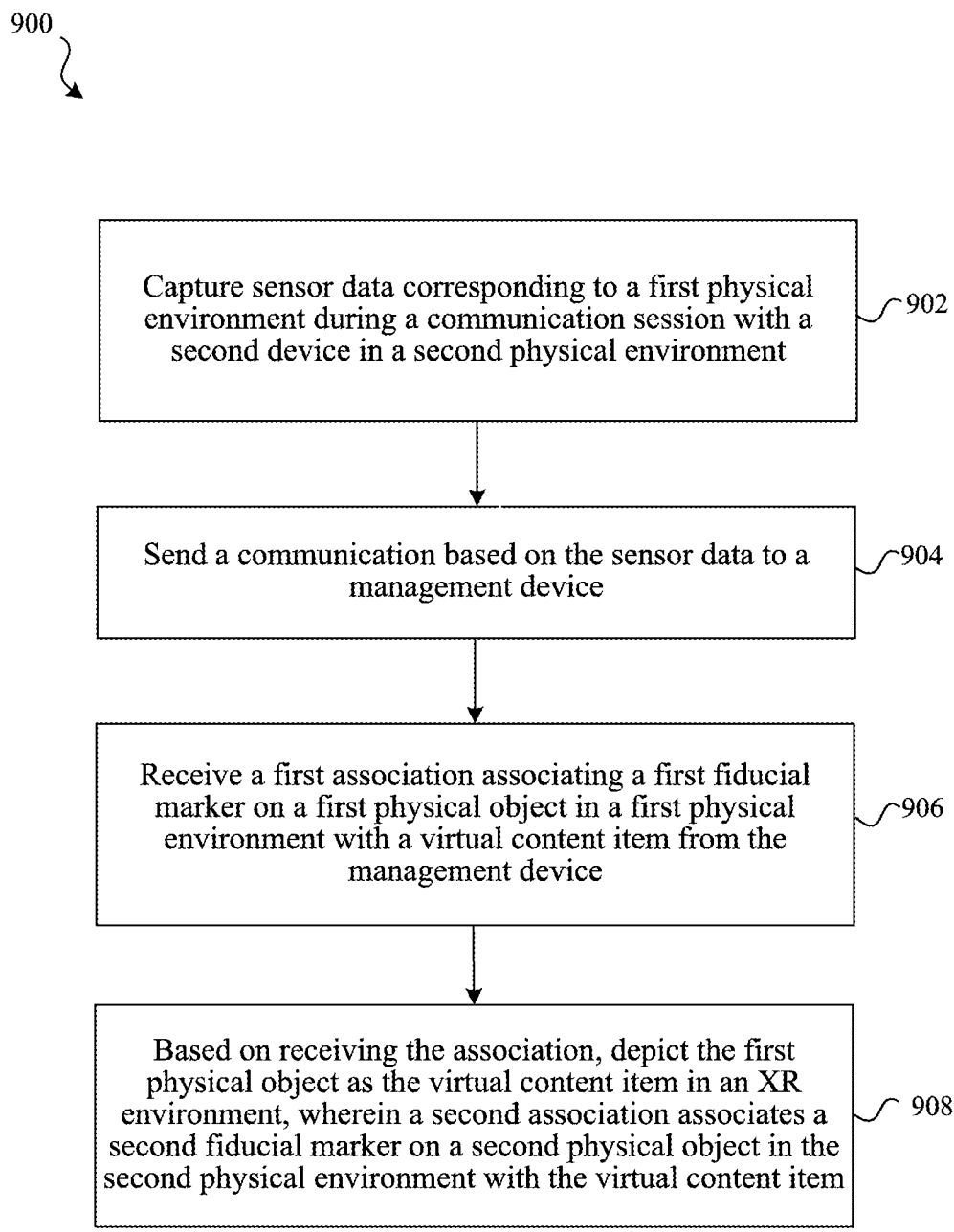
FIG. 9 illustrates a flowchart illustrating an exemplary method performed by a participant device interacting with a device that is managing a shared XR experience in accordance with some implementations.

FIG. 9 is a flowchart illustrating a method 900 performed by a participant electronic device interacting with a device that is managing a shared XR experience. In some implementations, one or more devices (such as electronic device 105, electronic device 205, or both) performs method 900. In some implementations, method 900 is performed on a mobile device, desktop, laptop, head-mounted device (HMD), or ear-mounted device. The method 900 is performed by processing logic, including hardware, firmware, software, or a combination thereof. In some implementations, the method 900 is performed on a processor executing code stored in a non-transitory computer-readable medium (e.g., a memory).

At block 902, the method 900 captures sensor data (e.g., images, depth data etc.) corresponding to a first physical environment during a communication session with a second device in a second physical environment. The first physical environment and the second physical environment include different physical objects comprising fiducial markers, which may be but need not be the same. The first and second environments may include physical objects with fiducial markers that are laid out similarly, e.g., each having a draw pile, discard pile, etc. The physical environment may include physical objects that are held by the respective device users, e.g., each user holding a hand of physical cards with fiducial markers on them.

At block 904, the method 900 sends a communication based on the sensor data to a management device. The management device may be the second device or a separate device such as a server. In one example, the communication provides the sensor data, including an image depicting the first fiducial marker of the first physical object. In one example, the communication provides an identification of the first fiducial marker and positional data corresponding to the first physical object (e.g., in the user's hand, on the table, in a particular location on the table, on the discard pile, etc.). In one example, the communication comprises an identification of a user action. (e.g., playing a card on the discard pile, drawing a card from the draw pile, laying a card face up on the table, etc.)

At block 906, the method 900 receives a first association associating a first fiducial marker on a first physical object in a first physical environment with a virtual content item from the management device. For example, the first device may receive information from the management device associating the first physical object (e.g., a particular card with fiducial marker A) with a particular virtual content item (e.g., a 3 of hearts card).

At block 908, the method 900, based on receiving the association, depicting the first physical object as the virtual content item in an extended reality (XR) environment (e.g., the 3 of hearts is shown). A second association (that the first device need not be aware of) associates a second fiducial marker on a second physical object in the second physical environment with the virtual content item. For example, the second device itself or a separate management device may have assigned a card in the second physical environment in a corresponding physical position to the same virtual content, e.g., to the 3 of hearts card.

In some implementations, method 900 further involves adjusting the XR experience based on information received from the management device, e.g., as the game is played and interactions by other users change the game. For example, the method 900 may involve the first device receiving a third association from the management device associating the first physical object with a second virtual content (e.g., changing the card from a 3 of hearts to a 4 of diamonds) and, based on receiving the third association, depicting the first physical object as the second virtual content item the extended reality (XR) environment. (e.g., displaying the changed association)

Figure 10:
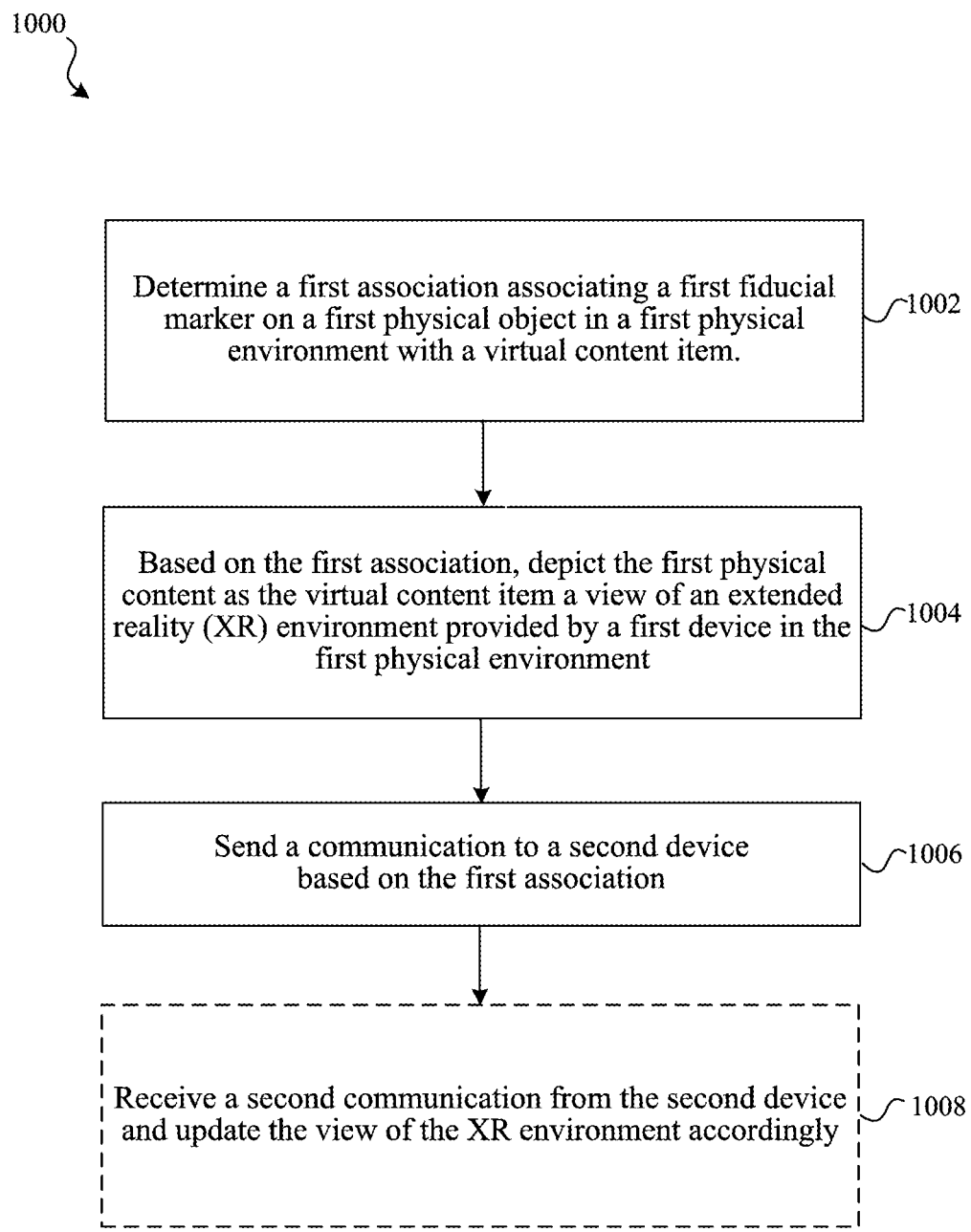
FIG. 10 illustrates a flowchart illustrating an exemplary method performed by a participant device with another device in a shared XR experience in which each device manages its own fiducial associations in accordance with some implementations.

FIG. 10 illustrates a flowchart illustrating an exemplary method 1000 performed by a participant device (i.e., a first device) with another device in a shared XR experience in which each device manages its own fiducial associations. In some implementations, one or more devices (such as electronic device 105, electronic device 205, or both) performs method 900. In some implementations, method 1000 is performed on a mobile device, desktop, laptop, head-mounted device (HMD), or ear-mounted device. The method 900 is performed by processing logic, including hardware, firmware, software, or a combination thereof. In some implementations, the method 1000 is performed on a processor executing code stored in a non-transitory computer-readable medium (e.g., a memory).

At block 1002, the method 1000 determines a first association associating a first fiducial marker on a first physical object in a first physical environment with a virtual content item. For example, this may involve associating marker A with the ace of hearts card. The association may be based on a random generation process, e.g., selecting a card based on a shared set of potential cards and/or a shared set of already assigned cards. The association may be based on information maintained by the first device and/or one or more other devices that is shared with the first device.

At block 1004, the method 1000, based on the first association, depicts the first physical content as the virtual content item a view of an extended reality (XR) environment provided by a first device in the first physical environment. For example, the first device may display to the first user virtual content on top of the generic playing card corresponding to the ace of hearts card.

At block 1006, the method 1000 sends a communication to a second device based on the first association, wherein the second association associates a second fiducial marker on a second physical object in a second physical environment with the virtual content item based on the communication. This communication may identify a position of a card to associate with the virtual content, e.g., associate the top discard pile card with the virtual ace of hearts so that the discard pile top cards match. Such position data may be determined based on sensor data, e.g., image data, depth data, etc.

At block 1008, the method 1000 optionally receives a second communication from the second device and updates its view of the XR environment accordingly. The second communication is based on a third association associating the third fiducial marker of a third physical object in the second physical environment with a second virtual content item. For example, as the second user of a second device lays a card from his hand on the discard pile in a second physical environment, the second device may send a second communication to the first device to update its association of the top card in his discard pile with that card value. The first device may then update its XR environment. The first device may determine a fourth association based on receiving the second communication. For example, the fourth association may associate (e.g., reassign) the first fiducial marker on the first physical object in the first physical environment with the second virtual content item. In another example, the fourth association associates (e.g., new assignment) a fourth fiducial marker on a fourth physical object in the first physical environment with the second virtual content item.

In the example of FIG. 10, each of the first device, the second device, and any other device involved in the experience may manage its own associations of its own physical objects with a common set of virtual objects in the XR environment. The devices may share data with one another regarding user interactions, placement of physical objects associated with virtual content items, associations of virtual content items, and other information with one another so that the set of devices collectively is able to facilitate a shared experience. The device may collectively manage associations between virtual content and different sets of physical objects and/or the rules and other management aspects of a game or other shared experience.

Figure 11:
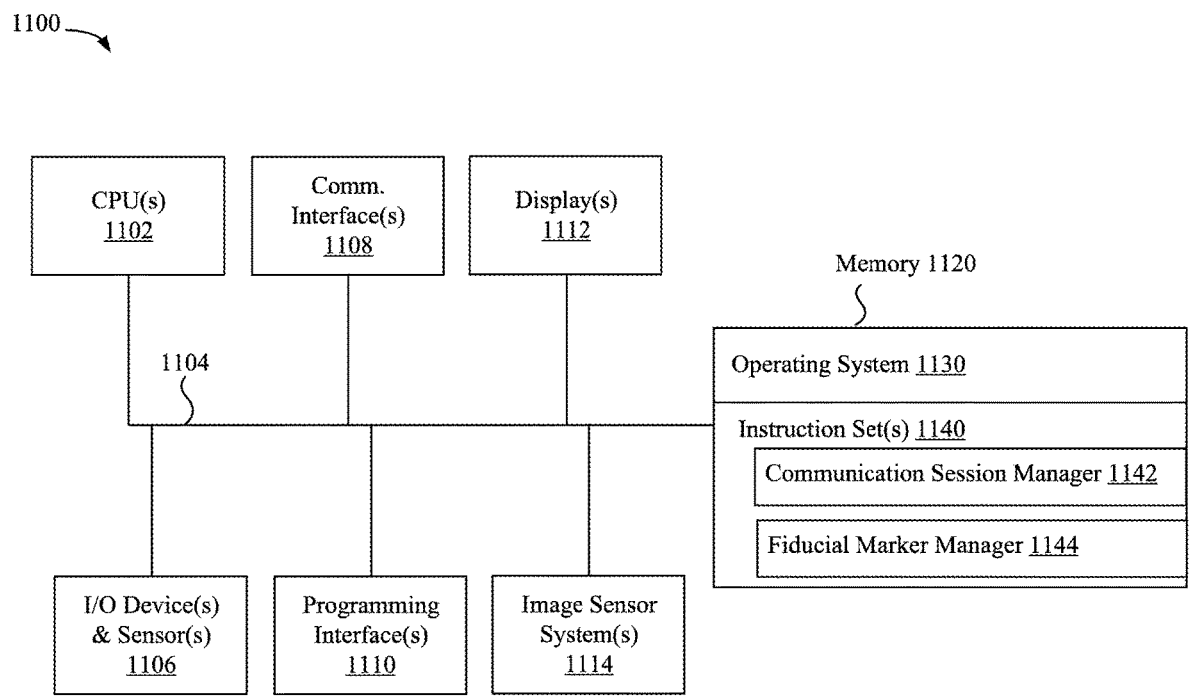
FIG. 11 is a block diagram of an electronic device of in accordance with some implementations.

FIG. 11 is a block diagram of electronic device 1100. Device 1100 illustrates an exemplary device configuration for electronic device 105, electronic device 205, or a separate device such as a server. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1100 includes one or more processing units 1102 (e.g., microprocessors, ASICs, FPGAs, GPUs, CPUs, processing cores, and/or the like), one or more input/output (I/O) devices and sensors 1106, one or more communication interfaces 1108 (e.g., USB, FIRE- WIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1110, one or more output device(s) 1112, one or more interior and/or exterior facing image sensor systems 1114, a memory 1120, and one or more communication buses 1104 for interconnecting these and various other components.

In some implementations, the one or more communication buses 1104 include circuitry that interconnects and controls communications between system components. In some implementations, the one or more I/O devices and sensors 1106 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1112 include one or more displays configured to present a view of a 3D environment to the user. In some implementations, the one or more displays 1112 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1100 includes a single display. In another example, the device 1100 includes a display for each eye of the user.

In some implementations, the one or more output device(s) 1112 include one or more audio producing devices. In some implementations, the one or more output device(s) 1112 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1112 may additionally or alternatively be configured to generate haptics.

In some implementations, the one or more image sensor systems 1114 are configured to obtain image data that corresponds to at least a portion of a physical environment. For example, the one or more image sensor systems 1114 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1114 further include illumination sources that emit light, such as a flash. In various implementations, the one or more image sensor systems 1114 further include an on-camera image signal processor (ISP) configured to execute a plurality of processing operations on the image data.

The memory 1120 includes high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 comprises a non-transitory computer readable storage medium.

In some implementations, the memory 1120 or the non-transitory computer readable storage medium of the memory 1120 stores an optional operating system 1130 and one or more instruction set(s) 1140. The operating system 1130 includes procedures for handling various basic system services and for performing hardware dependent tasks. In some implementations, the instruction set(s) 1140 include executable software defined by binary information stored in the form of electrical charge. In some implementations, the instruction set(s) 1140 are software that is executable by the one or more processing units 1102 to carry out one or more of the techniques described herein. The instruction set(s) 1140 include a communication session manager instruction set 1142 configured to, upon execution, provide a shared XR experience enables users to use physical objects from different environments that correspond to virtual content items, as described herein. The instruction set(s) 1140 include a fiducial marker manager instruction set 1144 configured to, upon execution, track the positions of fiducial markers used on physical objects and/or the associations of fiducial markers with virtual content during an XR experience, as described herein.

Although the instruction set(s) 1140 are shown as residing on a single device, it should be understood that in other implementations, any combination of the elements may be located in separate computing devices. Moreover, FIG. 11 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person.

Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
      associating a first fiducial marker on a first physical object in a first physical environment with a virtual content item, wherein the first physical object is depicted as the virtual content item in a first view of an extended reality (XR) environment provided by a first device in the first physical environment;
      determining a correspondence between the first physical object and a second physical object in a second physical environment separate from the first physical environment during a communication session between the first device and a second device; and
      based on the correspondence, associating a second fiducial marker on the second physical object with the virtual content item, wherein the second physical object is depicted as the virtual content item in a second view of the XR environment provided by the second device in the second physical environment.

2. The method of claim 1, wherein the first physical environment and the second physical environment each comprise a set of physical objects with unique fiducial markers, wherein the first physical environment comprises a first set of physical objects and the second physical environment comprises a second set of physical objects separate from the first set of physical objects.

3. The method of claim 2, wherein the unique fiducial markers are used to synchronize the depiction of virtual content items in the first physical environment and the second physical environment.

4. The method of claim 1, wherein the first physical object and the second physical object are cards.

5. The method of claim 1, wherein the first fiducial marking is depicted on only a single side of the first physical object.

6. The method of claim 1, wherein the first fiducial marking is depicted on multiple sides of the first physical object.

7. The method of claim 1, wherein the correspondence between first physical object and the second physical object is determined based on an interaction with the first physical object.

8. The method of claim 7, wherein the first physical object and the second physical object are cards, and the interaction is a placement of the first physical object on a game surface.

9. The method of claim 7, wherein the first physical object and the second physical object are cards, and the interaction is a placement of the first physical object on a stack of physical objects.

10. The method of claim 7, wherein the first physical object and the second physical object are cards, and the interaction is a reveal of a card held by a first user of the first device.

11. The method of claim 1, wherein the correspondence between first physical object and the second physical object is determined based on one or more instructions to position the first physical object or the second physical object.

12. The method of claim 1, wherein the correspondence between first physical object and the second physical object is determined based on a rule of a multi-player game.

13. The method of claim 1, wherein at least one of the first device or the second device is a head-mounted device (HMD).

14. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:
   associating a first fiducial marker on a first physical object in a first physical environment with a virtual content item, wherein the first physical object is depicted as the virtual content item in a first view of an extended reality (XR) environment provided by a first device in the first physical environment;
   determining a correspondence between the first physical object and a second physical object in a second physical environment separate from the first physical environment during a communication session between the first device and a second device; and
   based on the correspondence, associating a second fiducial marker on the second physical object with the virtual content item, wherein the second physical object is depicted as the virtual content item in a second view of the XR environment provided by the second device in the second physical environment.

15. The system of claim 14, wherein the first physical environment and the second physical environment each comprise a set of physical objects with unique fiducial markers, wherein the first physical environment comprises a first set of physical objects and the second physical environment comprises a second set of physical objects separate from the first set of physical objects.

16. The system of claim 15, wherein the unique fiducial markers are used to synchronize the depiction of virtual content items in the first physical environment and the second physical environment.

17. The system of claim 14, wherein the first physical object and the second physical object are cards.

18. The system of claim 14, wherein the correspondence between first physical object and the second physical object is determined based on an interaction with the first physical object, wherein the interaction is:
   a placement of the first physical object on a game surface;
   a placement of the first physical object on a stack of physical objects; or
   a reveal of a card held by a first user of the first device.

19. The system of claim 14, wherein the correspondence between first physical object and the second physical object is determined based on one or more instructions to position the first physical object or the second physical object.

20. A non-transitory computer-readable storage medium storing program instructions executable via one or more processors to perform operations comprising:
   associating a first fiducial marker on a first physical object in a first physical environment with a virtual content item, wherein the first physical object is depicted as the virtual content item in a first view of an extended reality (XR) environment provided by a first device in the first physical environment;
   determining a correspondence between the first physical object and a second physical object in a second physical environment separate from the first physical environment during a communication session between the first device and a second device; and
   based on the correspondence, associating a second fiducial marker on the second physical object with the virtual content item, wherein the second physical object is depicted as the virtual content item in a second view of the XR environment provided by the second device in the second physical environment.

\* \* \* \* \*